US012565329B2

(12) United States Patent
Wriede et al.

(10) Patent No.: US 12,565,329 B2
(45) Date of Patent: Mar. 3, 2026

(54) LINER SEGMENT FOR A FRAME BAY OF A FUEL TANK STRUCTURE AND SYSTEM FOR A TANK STRUCTURE, COMPRISING SUCH A LINER SEGMENT

(71) Applicants: Airbus Operations GmbH, Hamburg (DE); Airbus Operations Ltd., Bristol (GB)

(72) Inventors: Stefan Wriede, Hamburg (DE); Malte Vollmer, Hamburg (DE); Frederic Gobin, Hamburg (DE); Christopher Slack, Bristol (GB)

(73) Assignees: Airbus Operations GmbH, Hamburg (DE); Airbus Operations Ltd., Bristol (GB)

( * ) Notice: Subject to any disclaimer, the term of this patent is extended or adjusted under 35 U.S.C. 154(b) by 0 days.

(21) Appl. No.: 18/641,967

(22) Filed: Apr. 22, 2024

(65) Prior Publication Data

US 2024/0351700 A1 Oct. 24, 2024

(30) Foreign Application Priority Data

Apr. 24, 2023 (EP) ..................................... 23169633

(51) Int. Cl.
| | |
|---|---|
| *B64D 37/08* | (2006.01) |
| *B64D 37/04* | (2006.01) |
| *B64D 37/32* | (2006.01) |

(52) U.S. Cl.
CPC ............. *B64D 37/08* (2013.01); *B64D 37/32* (2013.01); *B64D 37/04* (2013.01)

(58) Field of Classification Search
CPC ........ B64D 37/08; B64D 37/32; B64D 37/04; B64D 37/06; B60K 15/03; B60K 15/077;
(Continued)

(56) References Cited

U.S. PATENT DOCUMENTS 5,983,945 A 11/1999 Salmon
6,408,874 B1 6/2002 Keller
(Continued)

FOREIGN PATENT DOCUMENTS

CN 212355155 U * 1/2021
SE 530889 C2 * 10/2008 ........... B60K 15/077

OTHER PUBLICATIONS

English translation of CN 212355155 (Year: 2021).*
(Continued)

*Primary Examiner* — Don M Anderson
*Assistant Examiner* — Eric C Baldrighi
(74) *Attorney, Agent, or Firm* — Lerner David LLP

(57) ABSTRACT

A liner segment for a frame bay of a fuel tank structure includes a liner segment base body adapted to float on fuel in the fuel tank structure, a liner segment side wall extending from the liner segment base body, a multitude of drainage holes arranged in the liner segment base body, and adapted to provide a bidirectional fluid connection from an upper side to a bottom side of the liner segment facing the fuel tank structure, a valve, arranged in a cut out of the liner segment and adapted to provide an unidirectional fluid connection from the bottom side of the liner segment to the upper side of the liner segment, such that the unidirectional fluid connection is blocked in the opposite direction, such that a remaining portion of fuel within the fuel tank structure is reduced.

14 Claims, 4 Drawing Sheets

(58) Field of Classification Search
CPC ........... B60K 2015/03026; B60K 2015/03256;
B60K 2015/03269; B60K 2015/0777
USPC ...................................................... 220/4.14
See application file for complete search history.

(56)                     References Cited

U.S. PATENT DOCUMENTS

| | | | |
|---|---|---|---|
| 2010/0200700 A1* | 8/2010 | West ...................... | B64D 37/08 |
| | | | 220/495.01 |
| 2011/0217510 A1* | 9/2011 | Harasse ................ | B64C 1/1446 |
| | | | 428/137 |

OTHER PUBLICATIONS

English translation of SE 530889 (Year: 2008).*
Extended European Search Report for Application No. 23169633.7
dated Sep. 29, 2023. 5 pgs.

* cited by examiner

50

10, 36          10`, 36          10`, 36

12`

36

38

14`

22          32

100

10

LINER SEGMENT FOR A FRAME BAY OF A FUEL TANK STRUCTURE AND SYSTEM FOR A TANK STRUCTURE, COMPRISING SUCH A LINER SEGMENT

FIELD OF THE INVENTION

The present invention relates to a liner segment for a frame bay of a fuel tank structure and a system for a tank structure, comprising such a liner segment.

BACKGROUND OF THE INVENTION

In aircrafts, a liner in each framebay of the fuselage can be used as an additional protection of a tank structure for the fuel needed to operate the aircraft. In the undesired case, for example caused by malfunction of the undercarriage during takeoff and landing, that a hole in the fuselage structure leads to a fuel leakage, the liner is an additional safety barrier and covers the hole and hereby decreases the leakage rate.

To prevent corrosion caused by a liner next to the fuselage, in addition to the volume above the liner, there is an additional volume of fuel underneath the liner. This volume is feeding slowly in in the space underneath the liner by means of drainage holes. The diameter of the drainage holes within the framebay of fuel pump picking points are not large enough to make the volume underneath the liner consumable for the fuel pumps in time, because the pumps have to be shut down to protect them from the possibility to run dry. This leads to the situation of remaining fuel portion per each framebay of up to 20 liters of fuel.

Thus, the current design leads to the situation that no overflow from one framebay to the adjacent one is possible, and therefore a relevant portion of fuel remains unusable and unreachable for fuel pumps within the tank.

This either leads to a problem of weight due to the remaining fuel or even of fulfilling authorities safety requirements. The total weight of the unused fuel that is unreachable for the fuel pumps at the picking points can add up to more than 350 liters, which leads to need to improve the possibility to reach the remaining fuel for the fuel pumps to address the above-mentioned problems.

BRIEF SUMMARY OF THE INVENTION

An aspect of the invention relates to increasing the usable tank volume and save weight due to reduction of remaining fuel portion for fulfillment of authority and customer requirements.

According to one aspect, a liner segment for a frame bay of a fuel tank structure is provided. The liner segment comprises a liner segment base body, wherein the liner segment base body is adapted to float on fuel on the bottom of the fuel tank structure. In other words, the liner segment base body is a planar structure that is adapted to be arranged in a floating manner on the fuel tank structure to protect the fuselage of an aircraft, more specifically an additional protection of a tank structure against leakage in case of undesired holes in the fuselage.

The liner segment further comprises at least one liner segment side wall, wherein the at least one liner segment side wall extends from the liner segment base body. Preferably the liner segment sidewall extends rectangular from the liner segment base body. More preferably the liner segment base body comprises a liner segment sidewall extending in a rectangular manner from each side of the liner segment base body. Preferably the height of the liner segment sidewall corresponds with the height of a frame in the fuselage of an aircraft.

The liner segment further comprises a multitude of drainage holes, wherein the multitude of drainage holes is arranged in the liner segment base body. The multitude of drainage holes is adapted to provide a bidirectional fluid connection from an upper side of the liner segment to a bottom side of the liner segment facing the fuel tank structure. Preferably the multitude of drain holes is arranged near at least one liner segment side wall. Preferably a liner segment comprises more than 1, more preferably more than 15, most preferably more than 30 drainage holes, preferably arranged in an equidistant manner. In other words, the drainage holes enable the fuel from above the liner segment to flow in the space beneath the liner segment and vice versa, enabling the liner segment to float on the fuel beneath the liner segment.

Further, the liner segment comprises at least one valve, arranged in a cut out of the liner segment. The at least one valve is adapted to provide an unidirectional fluid connection from the bottom side of the liner segment to the upper side of the liner segment, such that the unidirectional fluid connection is blocked in the opposite direction. In other words, the valve enables fuel from beneath the liner segment coming via the multitude of drainage holes to flow back above the liner segment. Concurrent, the valve is adapted to block fuel from above the liner segment to flow beneath the liner segment.

Hence, a remaining portion of fuel within the fuel tank structure is reduced by securing the fuel flow from underneath a liner segment that is needed to extend safe fuel pump operation in the fuel tank structure. In other words, a valve is a device that regulates the flow of a fluid, such that an unidirectional flow is provided, and thereby increases the reachable fuel for the fuel pumps.

Hence, the liner segment describes a concept to reduce the portion of remaining and therefore unusable fuel within a structural tank in combination with a liner material. Due to the fact that the diameters of the existing multitude of drainage holes are too small to ensure a proper overflow rate from adjacent frame bays or even just from underneath the liner, this remaining fuel portion is now consumable for the fuel pumps in the relevant frame bay via the valve.

Therefore, it is proposed to install into the liner segment of the relevant frame bay with fuel pump picking point a dedicated number of valves which ensures a free flow of fuel from underneath the liner segment to above the liner segment and therefore increasing the overflow rate of fuel and making it consumable for the fuel pumps. A minimum fuel flow rate has to be ensured to protect the fuel pumps against running dry. The flow of fuel in the opposite direction is be blocked by the valve.

According to one embodiment, the at least one valve is a flap valve. A flap valve permits fluid to flow in one direction while preventing backflow. A spring-loaded or weighted flap affixed to the opening of the cutout accomplishes this function. Flap valves are used to direct flow in the desired direction. They can be opened manually or remotely, and they can be opened by the force of the flow. The flap valve will open when direct pressure is applied to it, and it will close when that pressure is alleviated.

In other words, it is proposed to introduce the flap valve in the frame bay of fuel pump picking points to reduce the unused fuel portions and to save weight to this remaining fuel.

The total effective diameter of the flap valve is as big as needed to secure the fuel flow from underneath the liner of adjacent frame-bays in the tank that is needed to extend safe fuel pump operation.

The flap valve is directly installed to the flexible liner material preferably without additional fixation to a substructure of the liner segment.

The flap of the valve itself is preferably flexible with reinforcements to ensure proper operation and it is preferably clamped in between two plates.

In case of structural failure of the tank itself, the flap valves will close caused by pressure degradation underneath the liner. This will ensure the proper function of the liner segment with its calculated leakage rate only caused by the diameters of the multitude of drainage holes.

According to another embodiment, the at least one flap valve comprises a clamping plate with an integrated valve-flap stop, a valve-flap with reinforcement at a feedthrough area and a valve backplate.

In an optional embodiment the valve further comprises a filter.

According to another embodiment, the valve-flap comprises a flexible material.

Another possible embodiment of a valve is a diaphragm valve. A diaphragm valve consists of a valve body with two or more ports, an elastomeric diaphragm, and a seat upon which the diaphragm closes the valve. The valve body may comprise plastic, metal, or other materials or material combinations.

Another possible embodiment of a valve includes a flexible element like a spring, a rubber band or the like. The spring rate of the flexible element is adjusted in accordance with the desired flow rate of the fuel.

According to another embodiment, the at least one valve is arranged in a cut out in the liner base body. The arrangement of the flap valves in the liner segment base body is advantageous for the flow of the remaining fuel since the liner segment base body is near the lowest point of the fuel tank structure. An arrangement of the flap valves in the liner segment base body is therefore advantageous to reduce the unreachable fuel to a desired minimum.

According to another embodiment, the at least one valve is arranged in a cut out in the at least one liner segment side wall. It is also possible to combine the arrangement of the valves in the liner segment base body with the arrangement of valves in the liner segment side walls. Preferably the arrangement of the valves is in all liner segment side walls extending preferably in a rectangular manner from the liner segment base body.

According to another embodiment, the liner segment comprises aramid fiber with fluorosilicone plies with dissipative properties. Aramid is short for aromatic polyamide, are a class of heat-resistant and strong synthetic fibers. The chain molecules in the fibers are highly oriented along the fiber axis. As a result, a higher proportion of the chemical bond contributes more to fiber strength than in many other synthetic fibers. Aramids have a very high melting point of more than 500° C., which is advantageous in case of fire or similar undesired temperature peaks near the fuel tank structure.

According to another embodiment, the at least one valve comprises a diameter of at least 10 mm and at most 75 mm. Preferably the valve comprises a diameter of 25,4 mm. In other embodiments the valve comprises a diameter with less than 10 mm or more the 75 mm.

According to another embodiment, wherein each one of the multitude of the drainage holes comprises a diameter of at most 2 mm, preferably at most 8 mm. Preferably the drainage hole comprises a diameter of 6 mm. In other embodiments the valve comprises a diameter with less than 2 mm or more the 8 mm.

According to another embodiment, the liner segment further comprises a multitude of longitudinal elevations, wherein in the multitude of longitudinal elevations is adapted to incorporate longitudinal stringers of the fuselage structure. In other words, an elevation is a channel-shaped elevation to cover a stringer and furthermore stiffens thin-walled components against deformation or vibration. The sidewalls of an elevation are also possible locations for arranging at least one valve adapted to provide an unidirectional fluid connection from the bottom side of the liner segment to the upper side of the liner segment, such that the unidirectional fluid connection is blocked in the opposite direction.

According to another embodiment, the liner segment comprises at least four valves. Preferably the four valves are arranged in sets of two valves on opposite liner segment side walls. In other embodiments more than four valves are present in the liner segment.

According to another embodiment, the frame bay is adapted to be connectable to a fuel pump at fuel pump picking points. The fuel system allows to pump, manage, and deliver the fuel to the propulsion system and auxiliary power unit.

According to another aspect, a system for a tank structure comprising a liner segment with a valve for a frame bay of a fuel tank structure is provided. The liner segment comprises a liner segment base body, wherein the liner segment base body is adapted to float on fuel in the fuel tank structure, and at least one liner segment side wall, wherein the at least one liner segment side wall extends from the liner segment base body. The liner segment further comprises a multitude of drainage holes, wherein the multitude of drainage holes is arranged in the liner segment base body, and wherein the multitude of drainage holes is adapted to provide a bidirectional fluid connection from an upper side of the liner segment to a bottom side of the liner segment facing the fuel tank structure.

Further, the liner segment comprises at least one valve, arranged in a cut out of the liner segment, wherein the at least one valve is adapted to provide an unidirectional fluid connection from the bottom side of the liner segment to the upper side of the liner segment, such that the unidirectional fluid connection is blocked in the opposite direction. Hence, a remaining portion of fuel within the fuel tank structure is reduced by securing the fuel flow from underneath a liner segment of an adjacent frame bay to the liner segment that is needed to extend safe fuel pump operation in the fuel tank structure.

The system further comprises a multitude of frame bays and a multitude of liner segments which is adapted to float on fuel in the tank structure. Each liner segment is adapted to float on fuel in one of the associated multitude of frame bays, wherein each liner segment comprises a liner segment base body and at least one liner segment sidewall. The liner segment sidewall extends from the liner segment base body and comprises a connection area. Further, the system comprises a multitude of connection profiles. The multitude of connection profiles is adapted to connect the multitude of liner segments and the liner segment with the valve in the connection area.

The system further comprises a fuel pump, wherein in the fuel pump is adapted to pump fuel out of the tank structure at fuel pump picking points, such that a remaining portion of fuel within the fuel tank structure is reduced by securing the fuel flow from underneath a liner of the multitude of liner segments of an adjacent frame bay to the liner segment that is needed to extend safe fuel pump operation in the fuel tank structure.

According to another embodiment, wherein the system is arranged in an aircraft, wherein the aircraft is selected of a group consisting of airplane, helicopter or drone.

According to another aspect, an airplane comprises a liner segment.

DETAILED DESCRIPTION

The illustrations in the figures are schematic and not to scale. If the same reference signs are used in different figures in the following description of the figures, they designate identical or similar elements. However, identical or similar elements can also be designated by different reference symbols.

Figure 1:
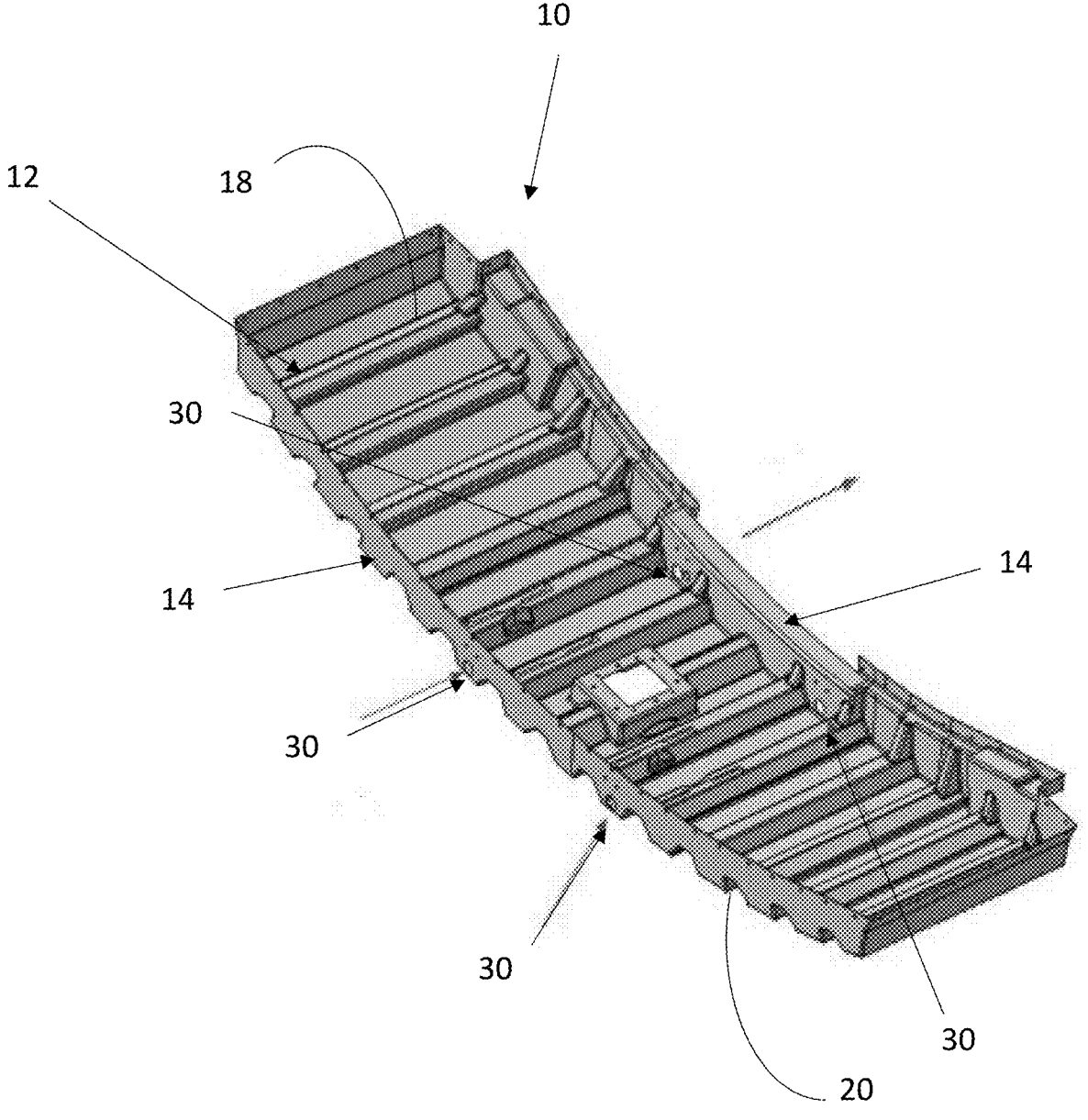
FIG. 1 shows a liner segment.

FIG. 1 shows a liner segment 10 for a frame bay 34 (not shown) of a fuel tank structure, comprising a liner segment base body 12, wherein the liner segment base body 12 is adapted to float on fuel in the fuel tank structure. The liner segment further comprises a liner segment side wall 14, wherein the liner segment side wall extends from the liner segment base body 12. The liner segment further comprises a multitude of drainage holes 16 (not shown), wherein the multitude of drainage holes 16 is arranged in the liner segment base body 12.

The multitude of drainage holes 16 is adapted to provide a bidirectional fluid connection from an upper side 18 of the liner segment 10 to a bottom side 20 of the liner segment 10 facing the fuel tank structure. The liner segment 10 further comprises at least one valve 22 (not shown), arranged in a cut out 30 of the liner segment 10, wherein the at least one valve 22 is adapted to provide an unidirectional fluid connection from the bottom side 20 of the liner segment 10 to the upper side 18 of the liner segment 10, such that the unidirectional fluid connection is blocked in the opposite direction.

Hence, a remaining portion of fuel within the fuel tank structure is reduced by securing the fuel flow from underneath the liner segment (not shown) of an adjacent frame bay to the liner segment 10 that is needed to extend safe fuel pump operation in the fuel tank structure.

The liner segment 10 according to the shown embodiment comprises four cutouts 30 arranged on opposite sides of the liner segment side walls 14.

Figure 2:
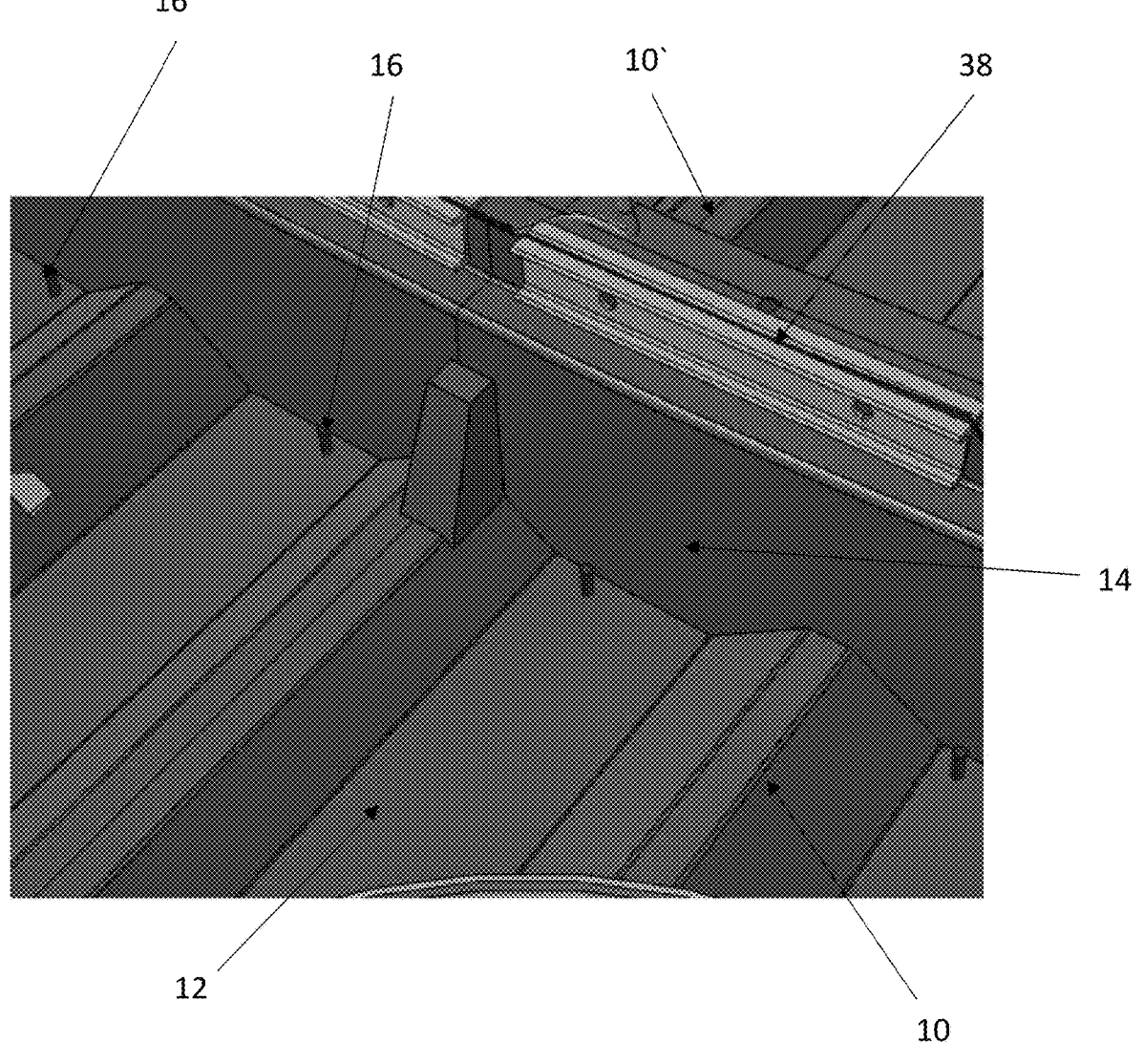
FIG. 2 shows a detailed view of a liner segment.

FIG. 2 shows a detailed view of a section of liner segment 10. The liner segment 10 comprises a multitude of drainage holes 16, wherein the multitude of drainage holes 16 is arranged in the liner segment base body 12.

The multitude of drainage holes 16 is adapted to provide a bidirectional fluid connection from an upper side 18 of the liner segment 10 to a bottom side 20 of the liner segment 10 facing the fuel tank structure and vice versa. The liner segment sidewall 14 extends from the liner segment base body 12 and comprises a connection area. The liner segment 10 and the adjacent liner segment comprises a multitude of connection profiles 38, wherein the multitude of connection profiles 38 is adapted to connect the multitude of liner segment 10 and the adjacent liner segment 10'. The drainage holes ensure only a very limited exchange of fuel from underneath the liner segment 10.

Figure 3:
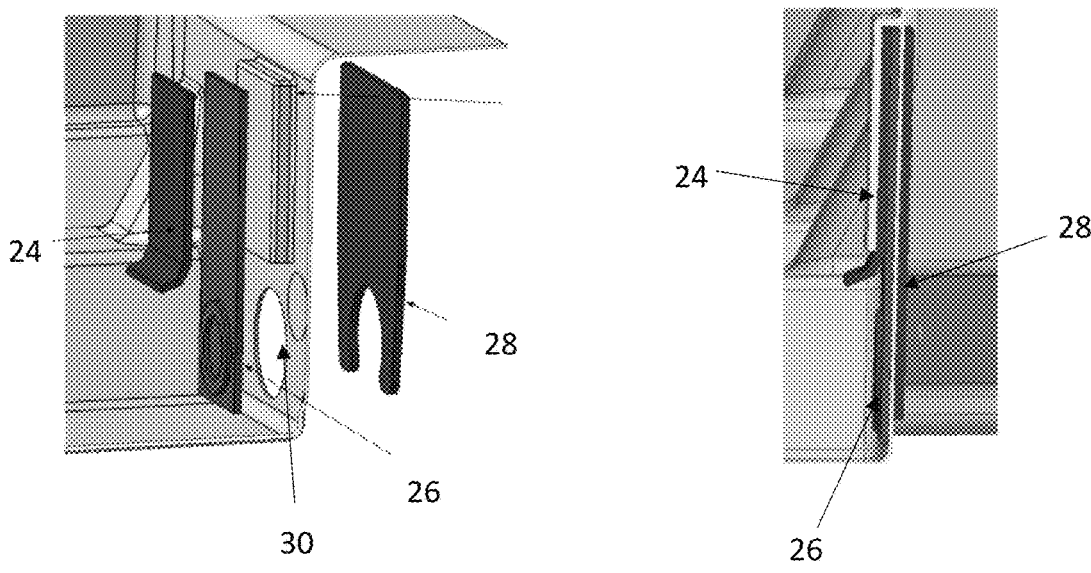
FIG. 3 shows two detailed views of a flap valve.

FIG. 3 shows a detailed view of a flap valve. The left figure shows an exploded view of the flap valve. The flap valve comprises a clamping plate 24 with an integrated valve-flap stop. The clamping plate is preferably comprising a stiff material to hold the valve-flap properly at its desired attachment area at the liner segment side wall 14. The flap valve further comprises a valve-flap with reinforcement 26 at a feedthrough area. The flap valve with reinforcement 26 is made of aramid fiber with fluorosilicone plies with dissipative properties. Aramids have a very high melting point of more than 500° C., which is advantageous in case of fire or similar undesired temperature peaks near the fuel tank structure. The flap valve further comprises a valve backplate 28. The valve back plate 28 comprises the same material as the clamping plate and is adapted to be connected to the clamping plate 24.

The right figure shows a detailed side view of the flap valve in a mounted arrangement. The clamping plate 24 is in contact with the valve-flap with reinforcement 26. The valve-flap with reinforcement 26 seals the cut out 30 and therefore provides an unidirectional fluid connection from the bottom side of the liner segment 10 to the upper side of the liner segment 10, such that the unidirectional fluid connection is blocked in the opposite direction.

Figure 4:
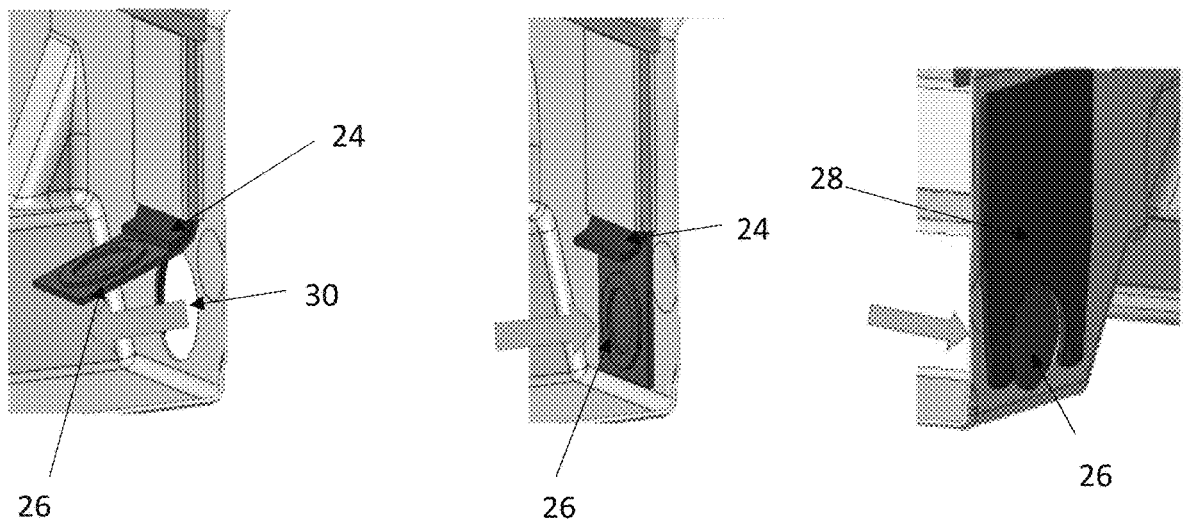
FIG. 4 shows another detailed view of a flap valve in different states.

FIG. 4 shows another detailed view of a flap valve in different states. In the figure on the left, the valve-flap with reinforcement 26 is open and enables a fluid flow from underneath the liner segment 10 to above the liner segment 10. The maximum opening position of the valve-flap with reinforcement 26 is restricted by the design of the clamping plate 24.

In the adjacent figure the valve-flap with reinforcement 26 is closed and prevents a fluid flow from underneath the liner segment 10 to above the liner segment 10. Therefore, the valve-flap provides an unidirectional fluid connection from the bottom side of the liner segment 10 to the upper side of the liner segment 10, such that the unidirectional fluid connection is blocked in the opposite direction. In the figure on the right another view of the flap valve in the closed position is shown.

Figure 5:
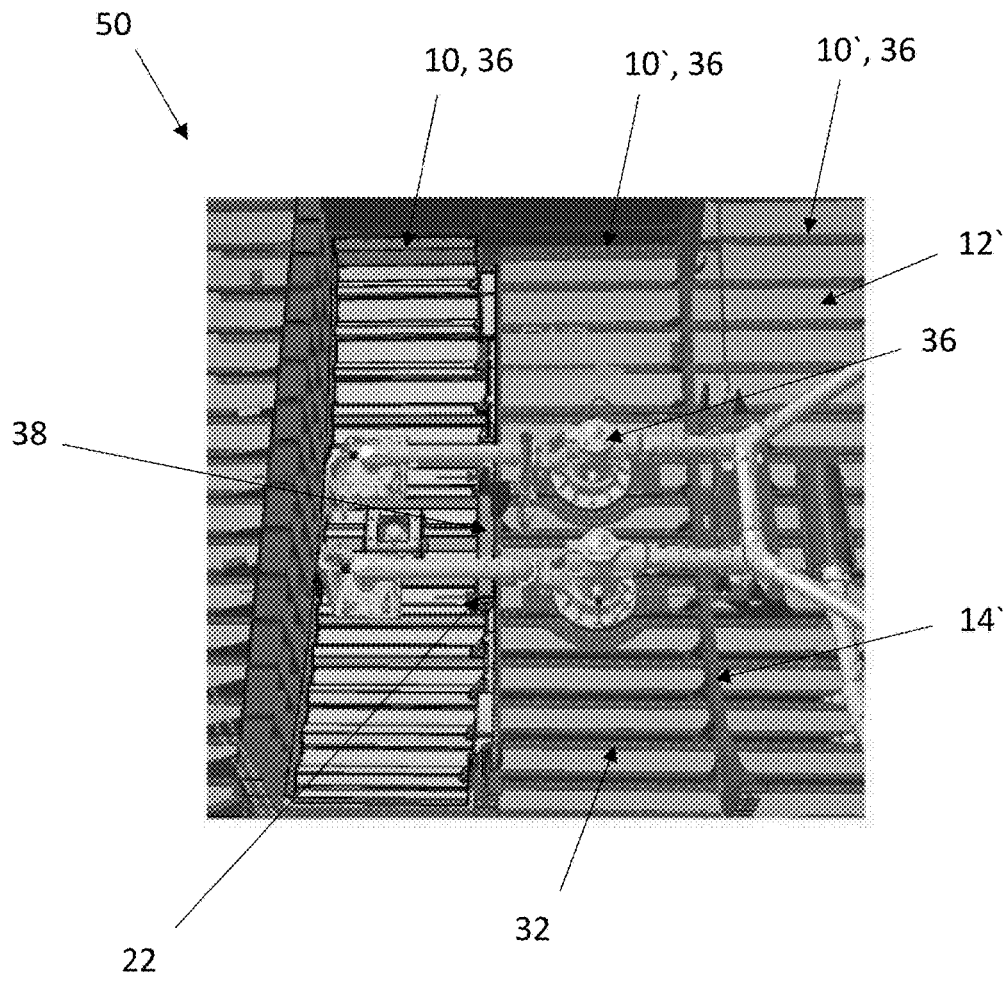
FIG. 5 shows a system for a tank structure comprising a liner segment.

FIG. 5 shows a system 50 for a tank structure, comprising a liner segment 10 and a multitude of frame bays 34. The liner segments 10, 10' are arranged in the frame bays 34. The system further comprises a multitude of liner segments 10' which is adapted to float on fuel in the tank structure. Each liner segment 10' is adapted to float on fuel in a corresponding one of the multitude of frame bays 34.

Further, each liner segment 10' comprises a liner segment base body 12' and at least one liner segment sidewall 14'. The liner segment sidewall 14' extends from the liner segment base body 12' and comprises a connection area and a multitude of connection profiles 38. The multitude of connection profiles 38 is adapted to connect the multitude of liner segments 10' and the liner segment 10.

The system further comprises a fuel pump 36, wherein in the fuel pump 36 is adapted to pump fuel out of the tank structure at fuel pump picking points, such that a remaining portion of fuel within the fuel tank structure is reduced by securing the fuel flow from underneath a liner of the multitude of liner segments of an adjacent frame bay to the liner segment that is needed to extend safe fuel pump operation in the fuel tank structure.

Figure 6:
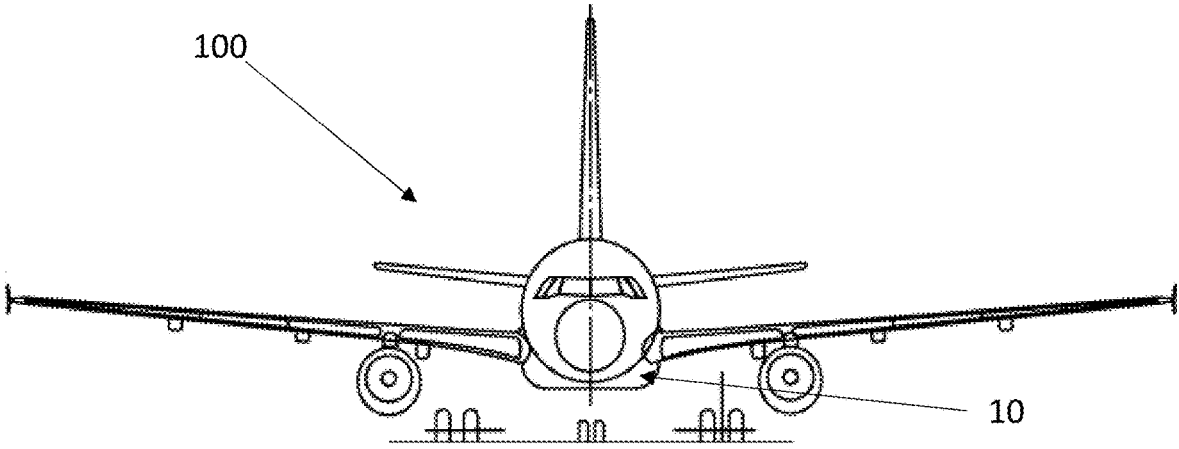
FIG. 6 shows an airplane with a liner segment for a tank structure.

FIG. 6 shows an airplane 100 with a liner segment 10. Further, the liner segment 10 comprises at least one valve 22, arranged in a cut 30 out of the liner segment 10. The at least one valve is adapted to provide an unidirectional fluid connection from the bottom side of the liner segment 10 to the upper side of the liner segment, such that the unidirectional fluid connection is blocked in the opposite direction.

Hence, a remaining portion of fuel within the fuel tank structure is reduced by securing the fuel flow from underneath a liner segment 10 of an adjacent frame bay to the liner segment 10 that is needed to extend safe fuel pump operation in the fuel tank structure. In other words, a valve is a device that regulates the flow of a fluid, such that an unidirectional flow is provided, to increase the reachable fuel for the fuel pumps.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

10 Liner segment
12 liner segment base body
14 liner segment side wall
16 drainage holes
18 upper side of the liner segment
20 bottom side of the liner segment
22 valve
24 clamping plate
26 valve flap with reinforcement
28 valve backplate
30 cut out
32 longitudinal beads
34 frame bay
36 fuel pump
38 connection profile
50 System
100 Airplane

The invention claimed is:

1. A liner segment for a frame bay of a fuel tank structure, comprising:
a liner segment base body, wherein the liner segment base body is adapted to float on fuel in the fuel tank structure,
at least one liner segment side wall, wherein the at least one liner segment side wall extends from the liner segment base body,
a multitude of drainage holes, wherein the multitude of drainage holes is arranged in the liner segment base body, and wherein the multitude of drainage holes is configured to provide a bidirectional fluid connection from an upper side of the liner segment to a bottom side of the liner segment facing the fuel tank structure,
at least four valves, each arranged in a cut out of the liner segment,
wherein the at least one valve is configured to provide an unidirectional fluid connection from the bottom side of the liner segment to the upper side of the liner segment, such that the unidirectional fluid connection is blocked in the opposite direction.

2. The liner segment according to claim 1, wherein each of the at least four valves is a flap valve.

3. The liner segment according to claim 2, wherein each of the flap valves comprises:
a clamping plate with an integrated valve-flap stop,
a valve-flap with reinforcement at a feedthrough area, or
a valve backplate.

4. The liner segment according to claim 3, wherein each of the flap valves comprises a flexible material.

5. The liner segment according to claim 1, wherein at least one of the at least four valves is arranged in a cut out in the liner segment base body.

6. The liner segment according to claim 1, wherein at least one of the at least four valves is arranged in a cut out in the at least one liner segment side wall.

7. The liner segment according to claim 1, wherein the liner segment comprises aramid fiber with fluorosilicone plies with dissipative properties.

8. The liner segment according to claim 1, wherein each of the at least four valves comprises a diameter of at least 10 mm and at most 75 mm.

9. The liner segment according to claim 1, wherein each one of the multitude of the drainage holes comprises a diameter of at most 2 mm.

10. The liner segment according to claim 1, further comprising a multitude of longitudinal elevations, wherein the multitude of longitudinal elevations are adapted to incorporate longitudinal stringers of a fuselage structure.

11. The liner segment according to claim 1, wherein the frame bay is configured to be connectable to a fuel pump at fuel pump picking points.

12. A system for a tank structure, comprising a liner segment for a frame bay of a fuel tank structure, the system comprising:
a liner segment base body, wherein the liner segment base body is adapted to float on fuel in the fuel tank structure,
at least one liner segment side wall, wherein the at least one liner segment side wall extends from the liner segment base body,
a multitude of drainage holes, wherein the multitude of drainage holes is arranged in the liner segment base body, and wherein the multitude of drainage holes is configured to provide a bidirectional fluid connection from an upper side of the liner segment to a bottom side of the liner segment facing the fuel tank structure,
at least one valve, arranged in a cut out of the liner segment,
wherein the at least one valve is configured to provide an unidirectional fluid connection from the bottom side of the liner segment to the upper side of the liner segment, such that the unidirectional fluid connection is blocked in the opposite direction, and wherein the system further comprises:

a multitude of frame bays, a multitude of liner segments configured to float on fuel in the tank structure, wherein each liner segment is configured to float on fuel in one of the multitude of frame bays, wherein each liner segment comprises a liner segment base body and at least one liner segment sidewall, wherein the liner segment sidewall extends from the liner segment base body and comprises a connection area, a multitude of connection profiles, wherein the multitude of connection profiles are configured to connect the multitude of liner segments and the liner segment of the frame bay, a fuel pump, wherein the fuel pump is configured to pump fuel out of the tank structure at fuel pump picking points.

13. The system according to claim 12, wherein the system is arranged in an aircraft, wherein the aircraft is selected of a group consisting of: airplane, helicopter or drone.

14. An airplane comprising a liner segment for a frame bay of a fuel tank structure, the line segment comprising:

a liner segment base body, wherein the liner segment base body is adapted to float on fuel in the fuel tank structure, at least one liner segment side wall, wherein the at least one liner segment side wall extends from the liner segment base body, a multitude of drainage holes, wherein the multitude of drainage holes is arranged in the liner segment base body, and wherein the multitude of drainage holes is configured to provide a bidirectional fluid connection from an upper side of the liner segment to a bottom side of the liner segment facing the fuel tank structure, at least one valve, arranged in a cut out of the liner segment, wherein the at least one valve is configured to provide an unidirectional fluid connection from the bottom side of the liner segment to the upper side of the liner segment, such that the unidirectional fluid connection is blocked in the opposite direction.

\* \* \* \* \*